US012681415B2

(12) United States Patent
Watatani et al.

(10) Patent No.: US 12,681,415 B2
(45) Date of Patent: Jul. 14, 2026

(54) FIXING DEVICE HAVING HEATER ATTACHED USING HEATER HOLDER, AND IMAGE FORMING APPARATUS INCLUDING THE SAME

(71) Applicant: KYOCERA Document Solutions Inc., Osaka (JP)

(72) Inventors: Tomohiro Watatani, Osaka (JP); Masakazu Uehara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/187,001

(22) Filed: Apr. 23, 2025

(65) Prior Publication Data

US 2025/0334908 A1 Oct. 30, 2025

(30) Foreign Application Priority Data

Apr. 25, 2024 (JP) ................................ 2024-071841

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
CPC ...................... G03G 15/2053; G03G 15/2064
See application file for complete search history.

(56) References Cited

U.S. PATENT DOCUMENTS

| | | | | |
|---|---|---|---|---|
| 2002/0118978 | A1* | 8/2002 | Nakamura | G03G 15/2017 399/69 |
| 2007/0177895 | A1* | 8/2007 | Yano | G03G 21/20 399/122 |
| 2020/0183307 | A1* | 6/2020 | Furuichi | G03G 15/2053 |
| 2022/0229387 | A1* | 7/2022 | Maruyama | G03G 15/2053 |
| 2022/0397847 | A1* | 12/2022 | Fujiwara | G03G 15/2053 |
| 2022/0404746 | A1* | 12/2022 | Maruyama | G03G 15/2039 |
| 2023/0244163 | A1* | 8/2023 | Miyazaki | G01K 7/18 399/69 |
| 2024/0160132 | A1* | 5/2024 | Seshita | G03G 15/2064 |
| 2026/0079431 | A1* | 3/2026 | Shimada | G03G 15/2053 |

FOREIGN PATENT DOCUMENTS

JP 2017097143 A 6/2017

* cited by examiner

*Primary Examiner* — Sevan A Aydin
(74) *Attorney, Agent, or Firm* — IP Business Solutions, LLC.

(57) ABSTRACT

In a fixing device, a heater holder comes into contact with an end of an insulation sheet and causes the insulation sheet to deform in a process of mounting a thermistor and the insulation sheet in the heater holder. Further, in a state in which mounting of the thermistor and the insulation sheet in the heater holder is completed, an inclined surface releases the end of the insulation sheet from contact with the heater holder.

4 Claims, 12 Drawing Sheets

FIXING DEVICE HAVING HEATER ATTACHED USING HEATER HOLDER, AND IMAGE FORMING APPARATUS INCLUDING THE SAME

INCORPORATION BY REFERENCE

This application claims priority to Japanese Patent Application No. 2024-071841 filed on Apr. 25, 2024, the entire contents of which are incorporated by reference herein.

BACKGROUND

The present disclosure relates to a fixing device and an image forming apparatus, in which recording paper passes through a nip area between an endless fixing belt and a pressure roller and an image formed on the recording paper is fixed.

There are fixing devices in which a pressure roller is brought into pressure-contact with an endless fixing belt, a nip area is formed between the endless fixing belt and the pressure roller, and recording paper passes through this nip area to fix an image formed on the recording paper. For example, a fixing device in which a nip area is formed between a tubular fixing film and a pressure roller, a temperature of a heater heating a fixing film is detected by a thermistor, heat generated by the heater is controlled on the basis of the temperature detected by the thermistor, and recording paper passes through the nip area to fix an image formed on the recording paper is known. In addition, in this fixing device, ceramic paper is interposed between the thermistor and the heater to make a contact state of the thermistor with respect to the heater stable.

SUMMARY

A further improved technology compared with the foregoing technology will be proposed as an aspect of the present disclosure.

A fixing device according to an aspect of the present disclosure includes a fixing belt, a pressure roller, a heater, a thermistor, an insulation sheet, a heater holder, and a biasing member. The fixing belt is endless. The pressure roller is brought into pressure-contact with the fixing belt. The heater is provided on an inward side of the fixing belt, receives a contact pressure of the pressure roller via the fixing belt, and heats the fixing belt. The thermistor is disposed on a surface of the heater facing a side opposite to the fixing belt. The insulation sheet is flexible and is wound around the thermistor. The heater holder holds the heater and has the thermistor around which the insulation sheet is wound mounted therein. The biasing member presses the thermistor mounted in the heater holder to the surface of the heater with the insulation sheet therebetween. The heater holder comes into contact with an end of the insulation sheet and causes the insulation sheet to deform in a process of mounting the thermistor and the insulation sheet in the heater holder, and is shaped to have a cutout for releasing the end of the insulation sheet from the contact in a state in which mounting of the thermistor and the insulation sheet in the heater holder is completed.

An image forming apparatus according to another aspect of the present disclosure includes the fixing device according to the aspect of the present disclosure, and an image forming device. The image forming device forms an image on recording paper. The fixing device thermally compresses an image formed on the recording paper with the recording paper in a nip area sandwiched between the fixing belt and the pressure roller.

BRIEF DESCRIPTION OF THE DRAWINGS

FIG. 4B is a cross-sectional view showing the fixing device cut along a-a in

FIG. 4A.

DETAILED DESCRIPTION

Figure 1:
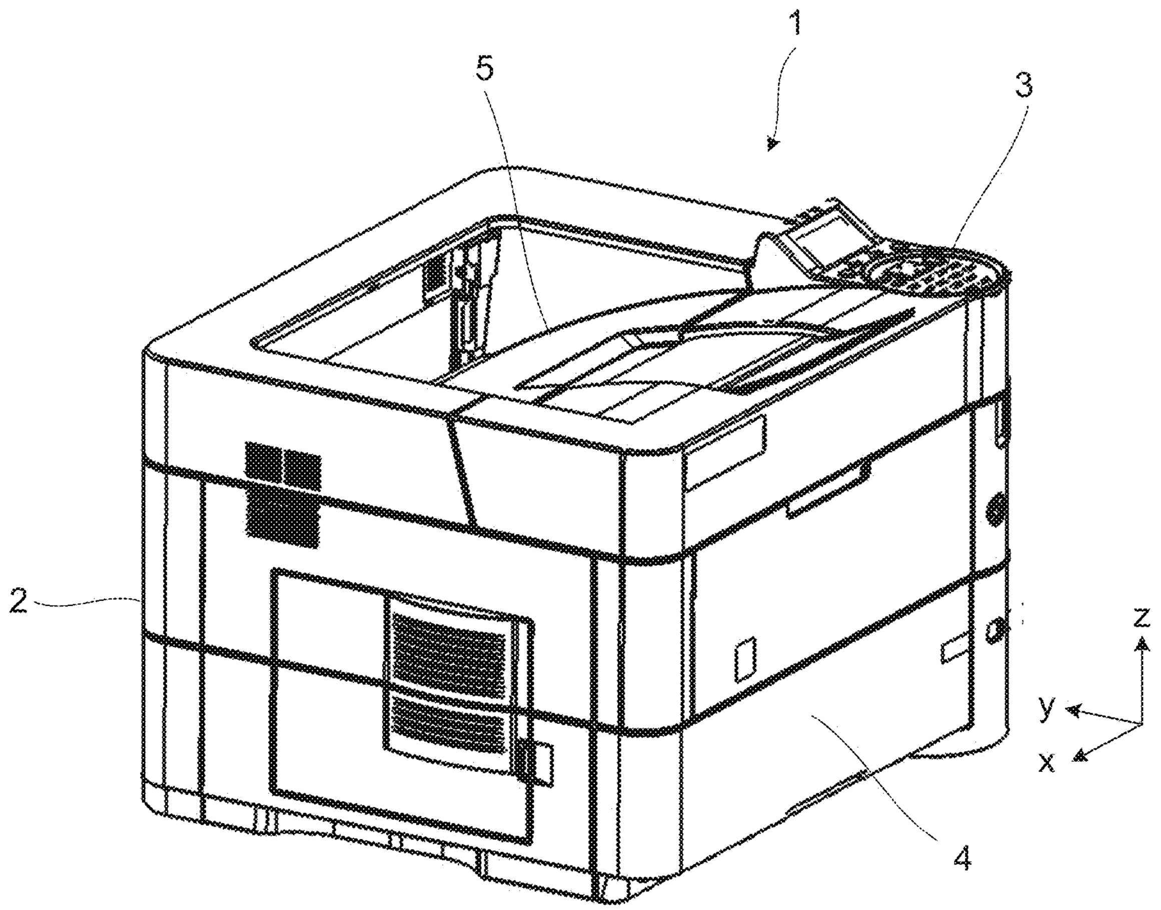
FIG. 1 is a perspective view showing an appearance of an image forming apparatus in which a fixing device according to an embodiment of the present disclosure is applied.

Hereinafter, an embodiment of the present disclosure will be described with reference to the drawings. FIG. 1 is a perspective view showing an appearance of an image forming apparatus in which a fixing device according to an embodiment of the present disclosure is applied. In FIGS. 1 to 10, the arrow direction x will be regarded as a depth direction, the arrow direction y will be regarded as a width direction, and the arrow direction z will be regarded as a height direction.

A device main body 2 of an image forming apparatus 1 shown in FIG. 1 is provided with a plurality of constituent instruments for realizing various functions of the image forming apparatus 1. For example, the device main body 2 is provided with an image forming device, a fixing device, an operation device 3, a paper feeding cassette 4, a discharge tray 5, and the like.

The image forming device forms an image indicated based on image data on recording paper supplied from the paper feeding cassette 4. The recording paper on which an image has been formed is subjected to fixing processing by the fixing device and is discharged to the discharge tray 5.

For example, the operation device 3 includes a start key, a decision key for confirming an operation input, numeric input keys for inputting numerical values, and the like and receives instructions from an operator regarding various operations, processing, and the like. In addition, the operation device 3 includes a display device for displaying operation guides and the like to the operator.

Figure 2:
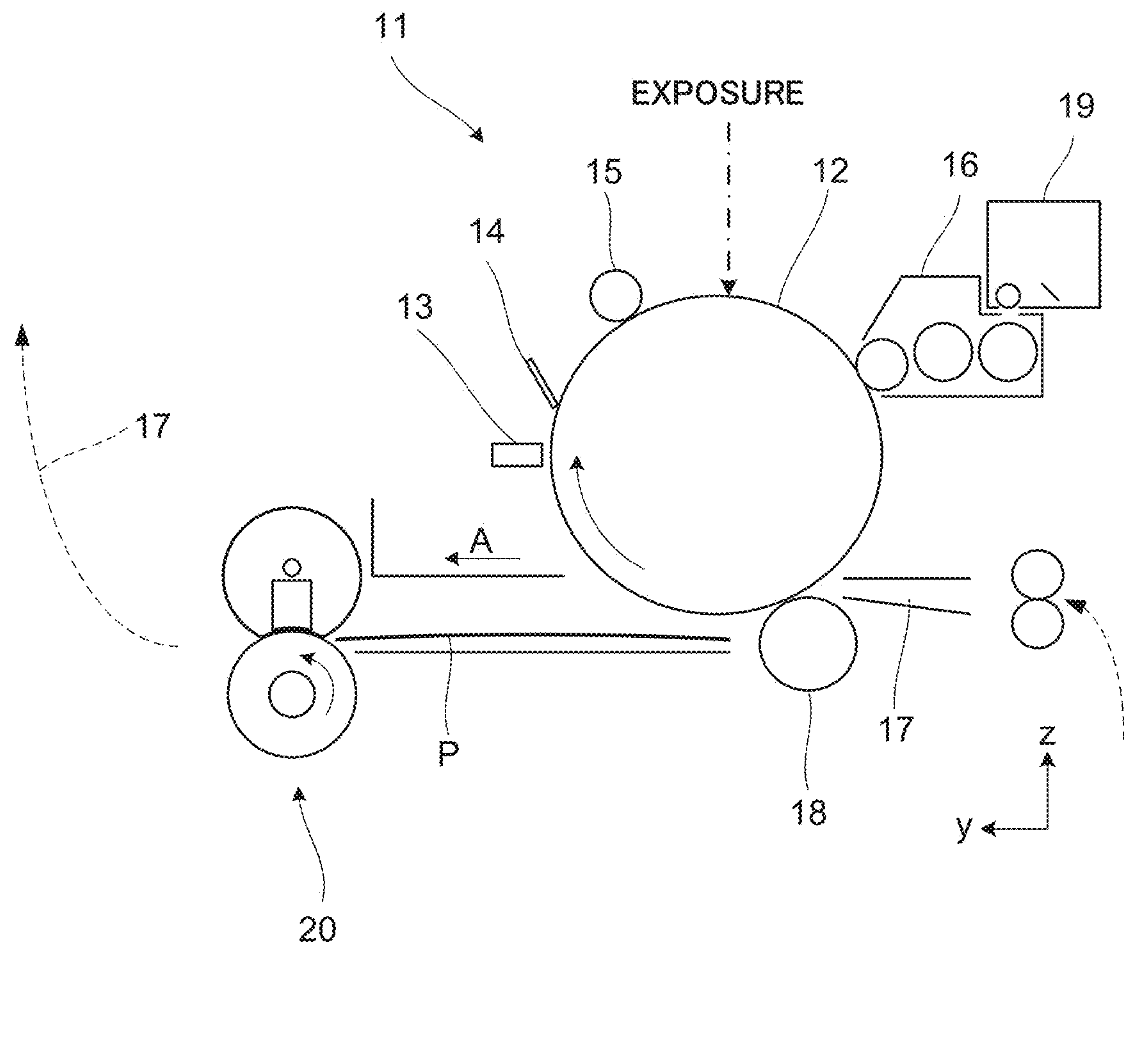
FIG. 2 is a cross-sectional view schematically showing an image forming device and the fixing device in the image forming apparatus.

FIG. 2 is a cross-sectional view schematically showing the image forming device and the fixing device in the image forming apparatus 1. An image forming device 11 is for forming a toner image on recording paper P supplied from the paper feeding cassette 4 by an electrophotographic method and includes a photosensitive drum 12 rotating in the arrow direction, a discharge device 13 discharging electricity from a surface of the photosensitive drum 12, a cleaning device 14 cleaning the surface of the photosensitive drum 12, a charging device 15 uniformly charging the surface of the photosensitive drum 12, a developing device 16 developing an electrostatic latent image generated on the surface of the photosensitive drum 12 by exposure from an exposure device (not shown) into a toner image, a toner container 19 supplying toner to the developing device 16, and the like.

In addition, the photosensitive drum 12 is brought into pressure-contact with a transfer roller 18 provided below the photosensitive drum 12, and a nip area is formed between the photosensitive drum 12 and the transfer roller 18.

When the recording paper P is supplied from the paper feeding cassette 4, this recording paper P is conveyed in an arrow direction A through a conveyance path 17. This recording paper P passes through the nip area between the photosensitive drum 12 and the transfer roller 18, and a toner image on the surface of the photosensitive drum 12 is transferred onto it. Subsequently, the recording paper P is conveyed to a fixing device 20, and the recording paper P is heated and pressurized by the fixing device 20. Accordingly, the toner image on the recording paper P is fixed. Moreover, the recording paper P is conveyed through the conveyance path 17 which is curved upward from the fixing device 20 and is discharged to the discharge tray 5 provided above the image forming apparatus 1.

Figure 3:
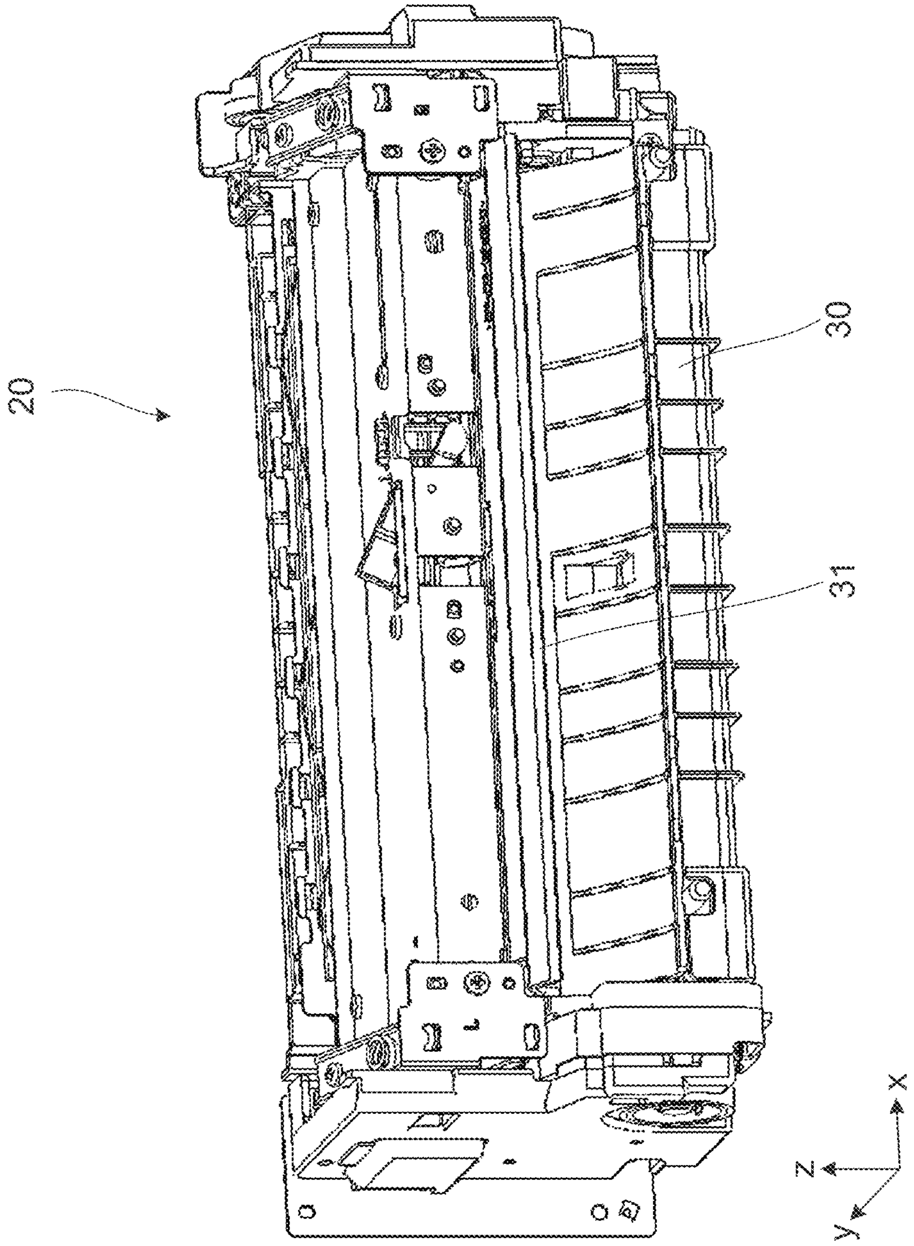
FIG. 3 is a perspective view showing an appearance of the fixing device of the present embodiment.

FIG. 3 is a perspective view showing an appearance of the fixing device 20 of the present embodiment. As shown in FIG. 3, the fixing device 20 includes a main body frame 30 formed by combining a synthetic resin molded member and a sheet metal, and each component of the fixing device 20 is supported by the main body frame 30. The main body frame 30 is provided with a conveyance entrance 31 for the recording paper P.

Figure 4A:
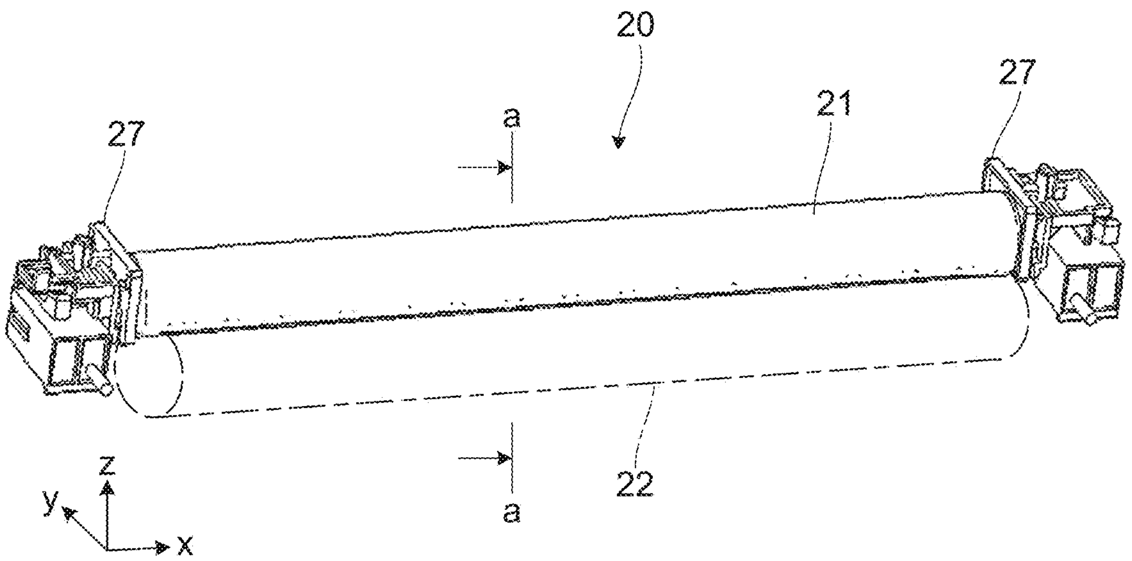
FIG. 4A is a perspective view showing main constituents of the fixing device.
Figure 4B:
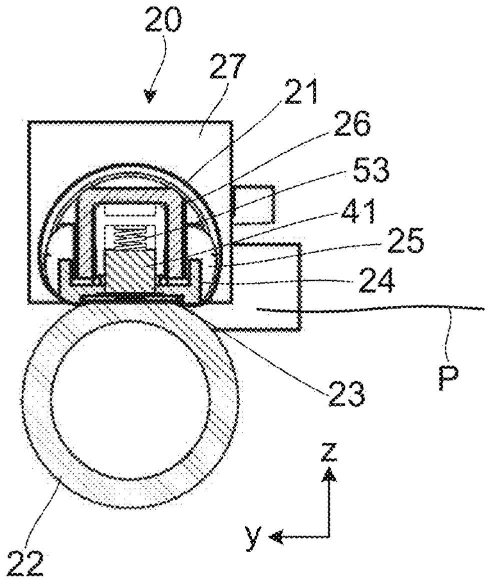

FIG. 4A is a perspective view showing main constituents of the fixing device 20, and FIG. 4B is a cross-sectional view showing the fixing device 20 cut along a-a in FIG. 4A. As shown in FIGS. 4A and 4B, the fixing device 20 includes a fixing belt 21, a pressure roller 22, a surface-shaped heater 23, a heater holder 24, a thermistor device 41, a stay sheet metal 26, a pair of holders 27, and the like.

The fixing belt 21 is a flexible sheet-like endless belt in which a base layer made of metal, synthetic resin, or the like, an elastic layer made of silicone rubber or the like, a mold-release layer made of synthetic resin or the like, and the like are stacked.

The inward side of the fixing belt 21 is provided with the surface-shaped heater 23 coming into slide contact with a lower part on an inner circumferential surface of the fixing belt 21, the heater holder 24 supporting the surface-shaped heater 23, a heat insulation holder 25, and the stay sheet metal 26 supporting the heater holder 24. The stay sheet metal 26 extends in a longitudinal direction of the fixing belt 21 and protrudes from both ends of the fixing belt 21. The heater holder 24 and the heat insulation holder 25 are products molded of synthetic resin.

A thermistor 43 of the thermistor device 41 (shown in FIGS. 6, 7, and the like) protrudes to the side of the surface-shaped heater 23 via an opening of the heater holder 24 and detects the temperature on an upper surface of the surface-shaped heater 23. The temperature of the surface-shaped heater 23 is controlled on the basis of the temperature on the upper surface of the surface-shaped heater 23 detected by the thermistor 43.

For example, the stay sheet metal 26 is molded to have a U-shaped cross section through sheet metal processing and has sufficient strength and rigidity. Each of the holders 27 is supported by the main body frame 30 of the fixing device 20. Both ends of the stay sheet metal 26 are supported by the respective holders 27. The heater holder 24 and the heat insulation holder 25 are supported by the stay sheet metal 26. The surface-shaped heater 23 is held by the heater holder 24. Therefore, the stay sheet metal 26 is supported by each of the holders 27 and supports the heater holder 24, the heat insulation holder 25, and the surface-shaped heater 23. Accordingly, each of the holders 27, the stay sheet metal 26, the heater holder 24, the heat insulation holder 25, and the surface-shaped heater 23 are integrally supported.

The pressure roller 22 is a metal cylinder body or columnar body whose outer circumferential surface is covered with a layer made of synthetic resin or the like. A shaft of the pressure roller 22 is rotatably supported by bearings on both outward sides of the pressure roller 22 and is provided parallel to a rotation center of the fixing belt 21.

When a rotation driving force of a motor (not shown) is transmitted to the shaft of the pressure roller 22 and the pressure roller 22 is driven to rotate in the arrow direction, the fixing belt 21 is driven to be rotated in a direction opposite to that of the pressure roller 22. In addition, the surface-shaped heater 23 is caused to generate heat to heat the fixing belt 21, and the temperature of the fixing belt 21 is set to a prescribed temperature suitable for fixing.

In this state, when the recording paper P is conveyed to a nip area N, the recording paper P is heated and pressurized in the nip area N, and a toner image on the recording paper P is fixed by thermocompression.

Figure 5A:
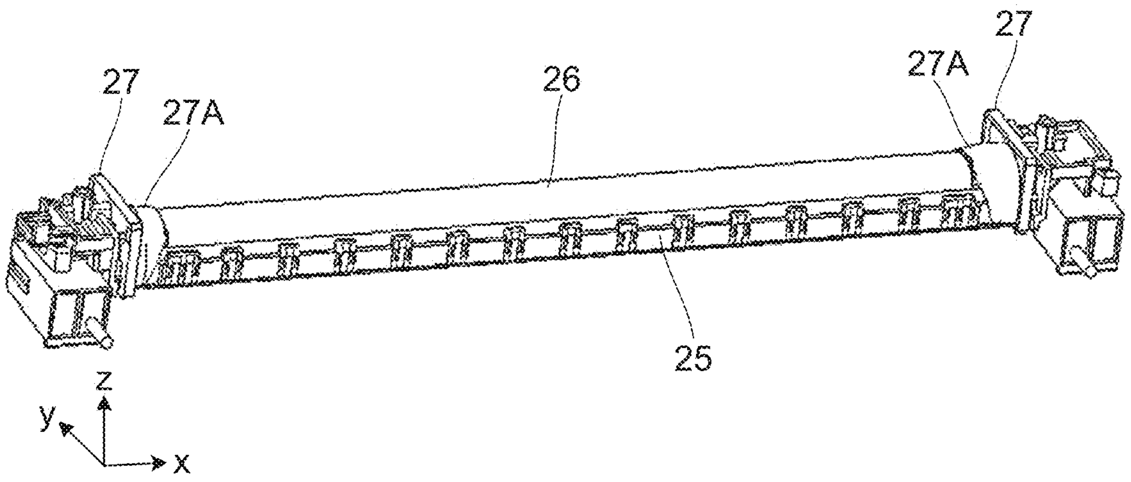
FIG. 5A is a perspective view showing a stay sheet metal, a pair of holders, and the like of the fixing device with a fixing belt removed.
Figure 5B:
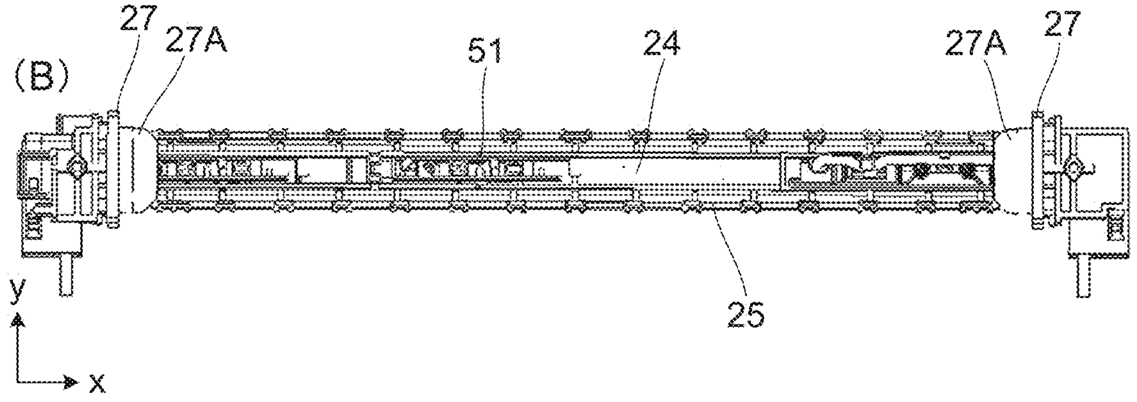
FIG. 5B is a plan view showing heater holders, a heat insulation holder, a thermistor holding device pressing a thermistor device, the pair of holders, and the like of the fixing device with the fixing belt and the stay sheet metal removed.

FIG. 5A is a perspective view showing the heat insulation holder 25, the stay sheet metal 26, the pair of holders 27, and the like with the fixing belt 21 removed, and FIG. 5B is a plan view showing the heater holder 24, the heat insulation holder 25, a thermistor holding device 51 pressing the thermistor device 41 (shown in FIGS. 6, 7, and the like), the pair of holders 27, and the like with the fixing belt 21 and the stay sheet metal 26 removed.

As shown in FIGS. 5A and 5B, the pair of holders 27 have annular frames 27A, respectively, and the annular frames 27A are inserted into the inward sides at both ends of the fixing belt 21. The outer circumferential surface of each of the annular frames 27A comes into contact with the inner circumferential surface at the end of the fixing belt 21, and the fixing belt 21 is held.

When the stay sheet metal 26 shown in FIG. 5A is removed, the heater holder 24, the thermistor holding device 51, and the like are exposed as shown in FIG. 5B. At least one thermistor device 41 is provided on the heater holder 24. When a plurality of thermistor devices 41 are provided, the thermistor devices 41 are disposed away from each other in the longitudinal direction of the heater holder 24.

Figure 6A:
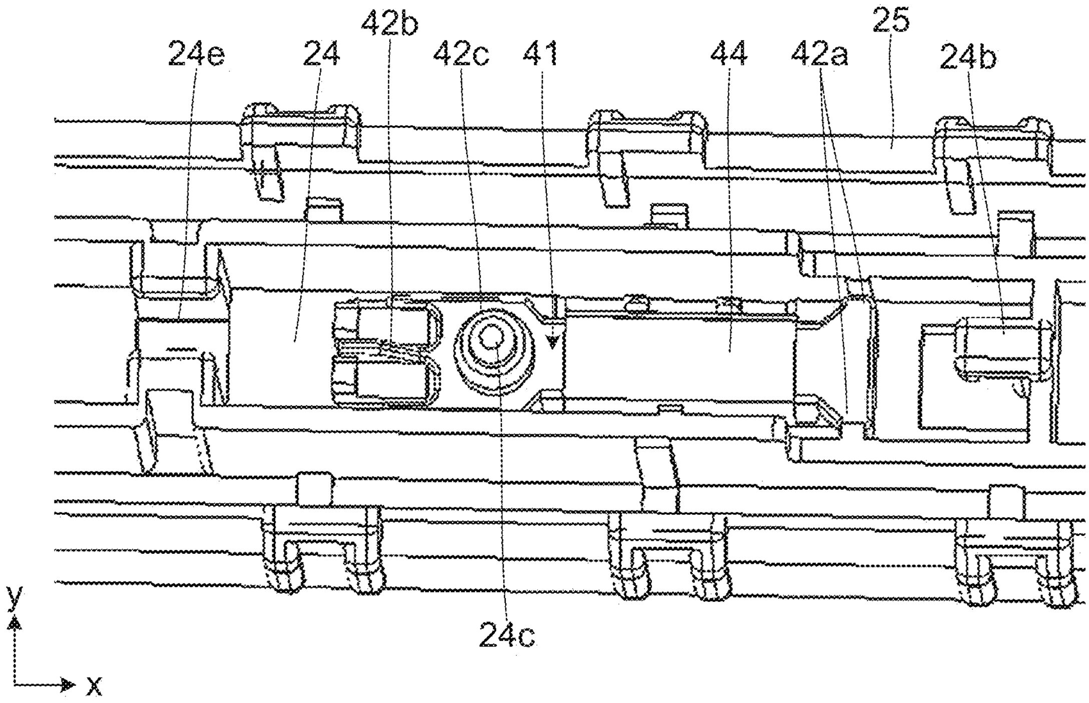
FIG. 6A is a perspective view of the thermistor device and the heater holder viewed from above.
Figure 6B:
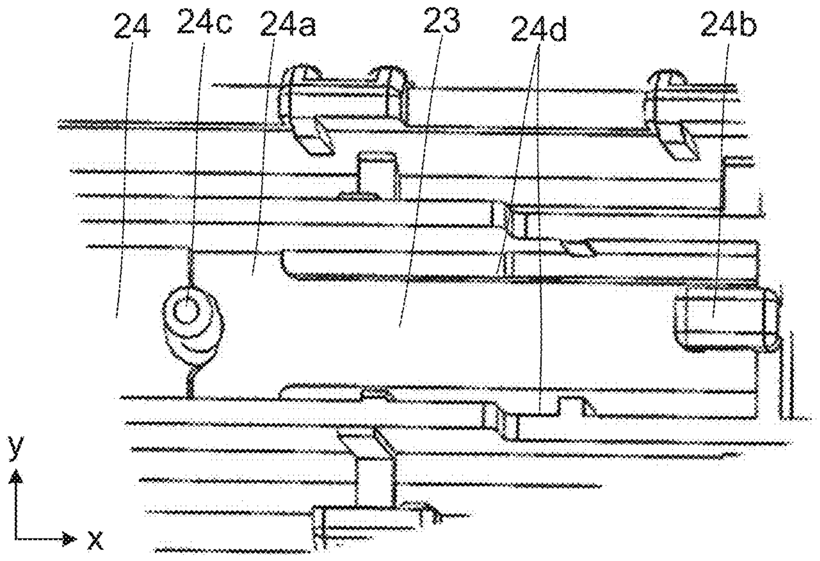
FIG. 6B is a perspective view showing the heater holder viewed from above with the thermistor device removed.
Figure 6C:
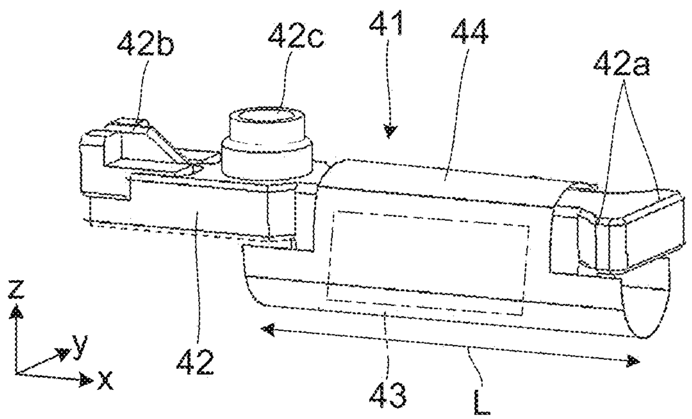
FIG. 6C is a perspective view showing the thermistor device viewed from a lateral side.

FIG. 6A is a perspective view of the thermistor device 41 and the heater holder 24 viewed from above, FIG. 6B is a perspective view showing the heater holder 24 viewed from above with the thermistor device 41 removed, and FIG. 6C is a perspective view showing the thermistor device 41 viewed from a lateral side.

As shown in FIG. 6C, the thermistor device 41 includes a frame 42, the thermistor 43 provided substantially at the center of the frame 42, and a flexible insulation sheet 44 wound around the frame 42 such that the thermistor 43 is covered. The frame 42 has a narrow central part, a pair of protruding parts 42*a* protruding to both sides of the frame 42 are formed at one end of the frame 42, and a protruding part 42*b* protruding upward is formed at the other end of the frame 42. A hollow annular part 42*c* protrudes near the other end of the frame 42. One end side of the insulation sheet 44 is engaged with the frame 42 and is wound around the frame 42 in a tubular shape, and the other end side thereof is also engaged with the frame 42 and is wound around the frame 42. In addition, in the insulation sheet 44 having a tubular shape, a length L of the lower half is longer than the length of the upper half.

As shown in FIG. 6B, a rectangular opening 24*a* is formed in the heater holder 24. The surface-shaped heater 23 overlaps the heater holder 24 below it, and the surface-shaped heater 23 is exposed through the opening 24*a*. One end of the opening 24*a* is provided with a hook 24*b*, a boss 24*c* protruding upward is provided at the other end of the opening 24*a*, and the shelves 24*d* are respectively provided on both sides of the opening 24*a*. In addition, as shown in FIG. 6A, the heater holder 24 is provided with a fitting recess spot 24*e* at a position away from the opening 24*a*.

As shown in FIG. 6A, the thermistor device 41 is disposed and mounted in the rectangular opening 24*a* of the heater holder 24. The thermistor 43 of the thermistor device 41 overlaps the upper surface of the surface-shaped heater 23 with the insulation sheet 44 therebetween and detects the temperature of the surface-shaped heater 23.

Figure 7A:
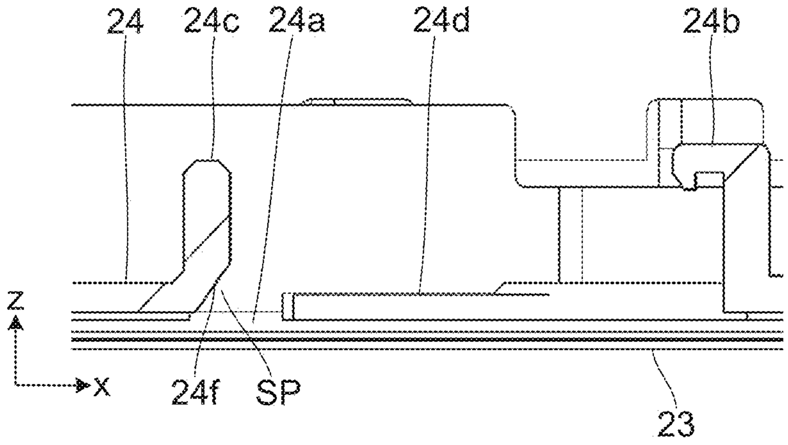
FIG. 7A to FIG. 7D are cross-sectional views showing a procedure of mounting the thermistor device in the heater holder.
Figure 7B:
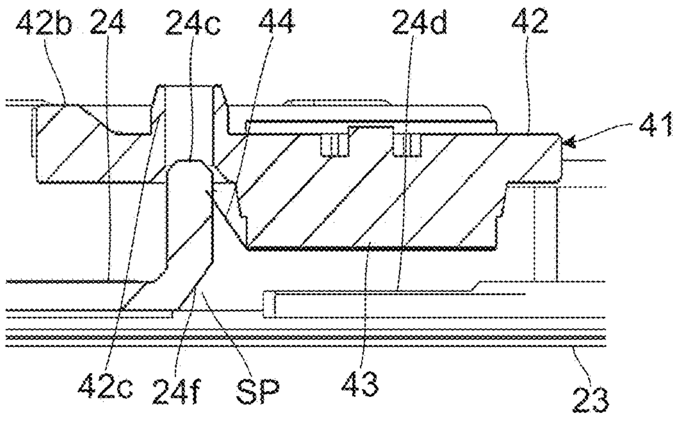
Figure 7C:
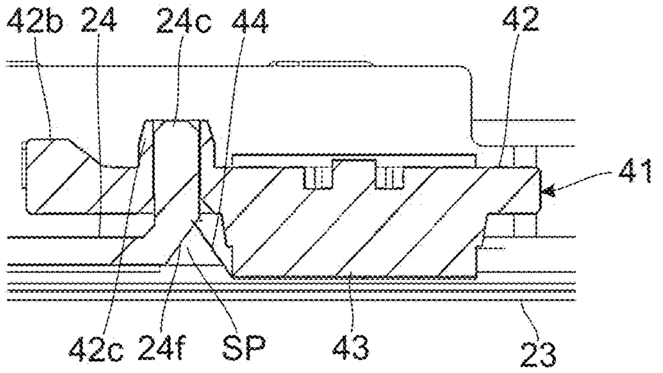

FIGS. 7A to 7D are cross-sectional views showing a procedure of mounting the thermistor device 41 in the heater holder 24. In the heater holder 24 before the thermistor device 41 shown in FIG. 7A is mounted, as shown in FIG. 7B, the thermistor device 41 is lowered from above the rectangular opening 24*a* of the heater holder 24, the boss 24*c* of the heater holder 24 is fitted into the hollow annular part 42*c* of the frame 42 of the thermistor device 41, and as shown in FIG. 7C, the pair of protruding parts 42*a* protruding to both sides of the frame 42 of the thermistor device 41 are caused to abut the respective shelves 24*d* on both sides of the opening 24*a* of the heater holder 24.

Accordingly, the thermistor device 41 is mounted in the heater holder 24.

Figure 8A:
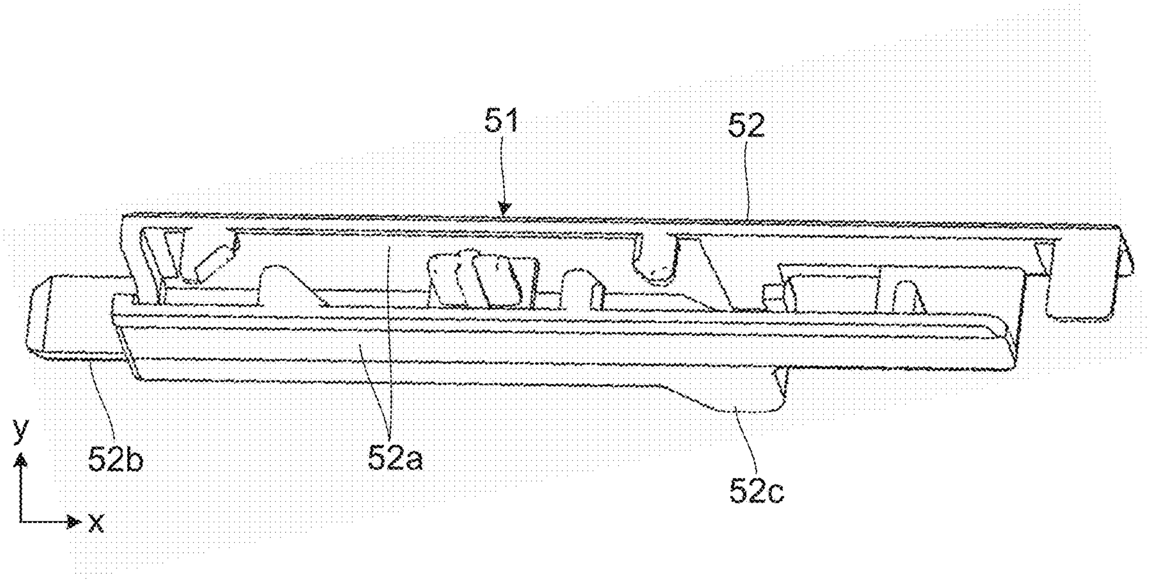
FIGS. 8A and 8B are perspective views showing the thermistor holding device viewed from above and below, respectively.
Figure 8B:
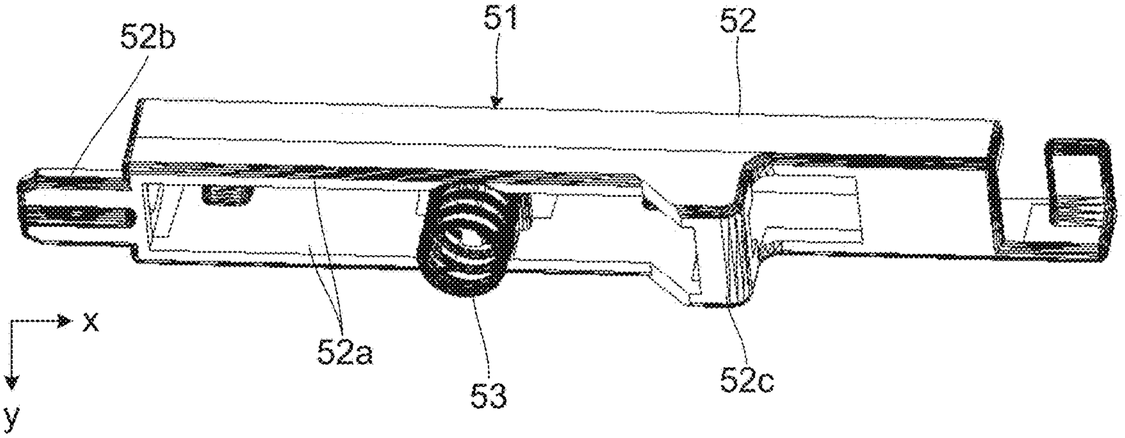

Moreover, the thermistor device 41 is pressed by the thermistor holding device 51 as shown in FIGS. 8A and 8B in a state of being disposed in the heater holder 24. FIGS. 8A and 8B are perspective views showing the thermistor holding device 51 viewed from above and below, respectively.

FIGS. 8A and 8B, the thermistor holding device 51 includes a frame body 52 and a coil spring 53. The frame body 52 includes side walls 52*a* on both sides, a positioning piece 52*b* protruding from one end of the side walls 52*a*, and an engagement part 52*c* protruding downward from the side walls 52*a*. The coil spring 53 protrudes downward substantially from the center of the frame body 52.

Figure 9A:
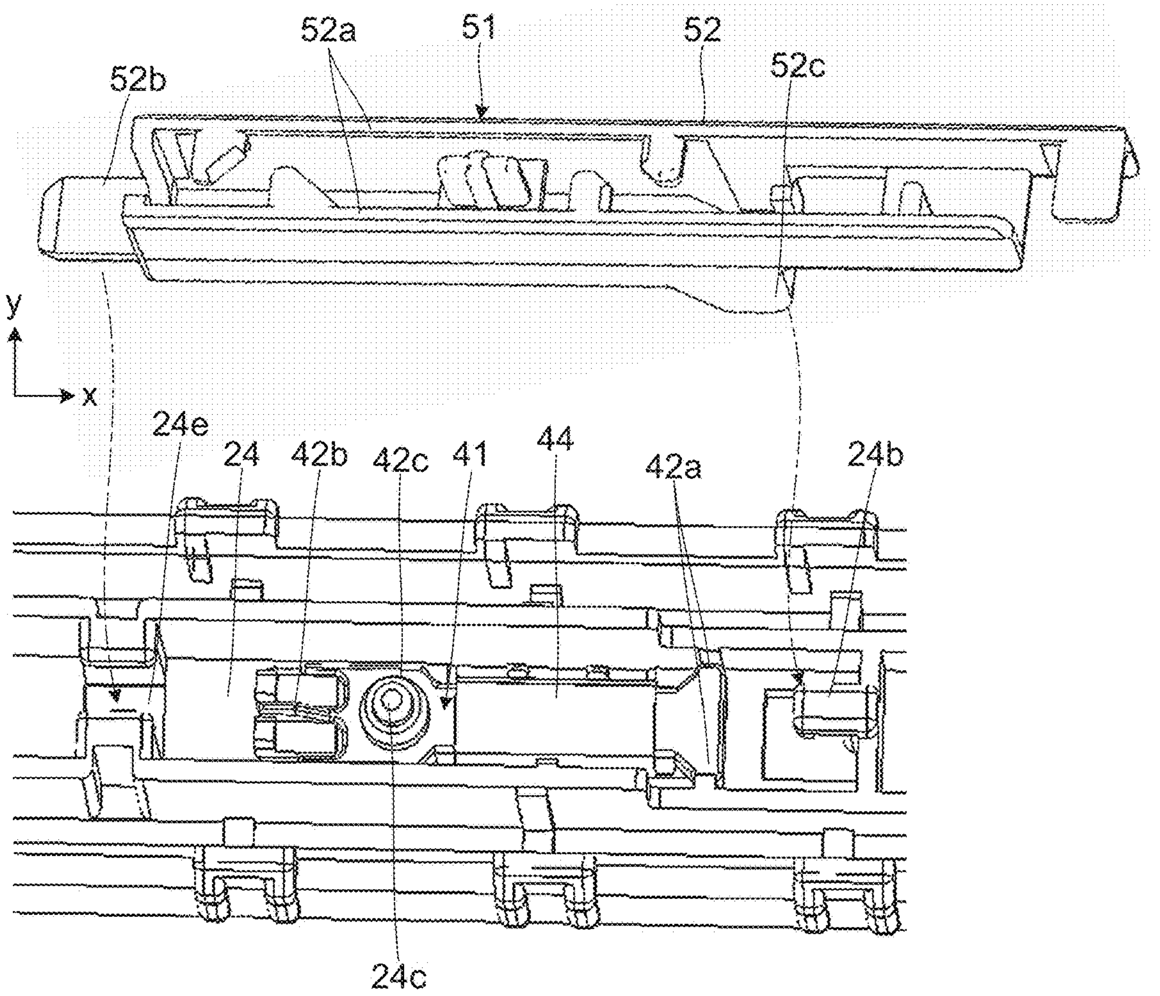
FIG. 9A is a perspective view showing the thermistor holding device, the thermistor device, and the heater holder.
Figure 9B:
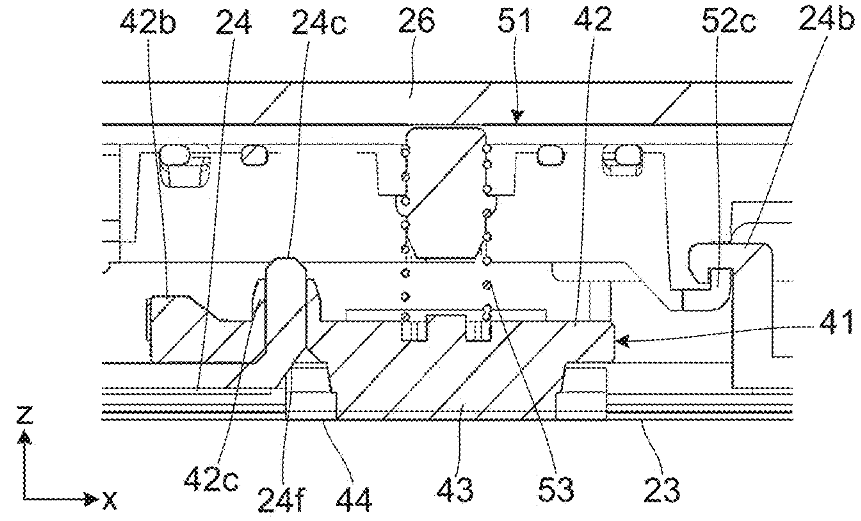
FIG. 9B is a cross-sectional view showing a state in which the thermistor holding device, the thermistor device, and the heater holder are assembled.

FIG. 9A is a perspective view showing the thermistor holding device 51, the thermistor device 41, and the heater holder 24, and FIG. 9B is a cross-sectional view showing a state in which the thermistor holding device 51, the thermistor device 41, and the heater holder 24 are assembled.

As shown in FIGS. 9A and 9B, the thermistor holding device 51 is lowered from above the thermistor device 41, and the positioning piece 52*b* of the thermistor holding device 51 is inserted into the fitting recess spot 24*e* of the heater holder 24. The engagement part 52*c* of the thermistor holding device 51 is hooked onto the hook 24*b* of the heater holder 24, and the thermistor holding device 51 is engaged with the heater holder 24. At this time, the coil spring 53 of the thermistor holding device 51 is compressed, and the thermistor 43 of the thermistor device 41 is pressed due to a biasing force of the coil spring 53 with the insulation sheet 44 therebetween. Accordingly, the thermistor device 41 is attached to the heater holder 24.

As is clear from FIG. 9B, the thermistor 43 of the thermistor device 41 is biased downward due to a biasing force of the coil spring 53 and is pressed against the upper surface of the surface-shaped heater 23 with the insulation sheet 44 therebetween, thereby being in a state of detecting the temperature of the surface-shaped heater 23.

Here, the insulation sheet 44 is provided so as to lengthen the insulation distance of the thermistor 43 and prevent intrusion of surrounding grease and the like into the thermistor 43, and it is desirable to increase the length of the insulation sheet 44 (length of the longitudinal direction of the surface-shaped heater 23). Hence, the insulation distance is further lengthened by further lengthening the length L of the lower half of the insulation sheet 44 having a tubular shape as shown in FIG. 6C than the length of the upper half thereof, and the effect of preventing intrusion of surrounding grease and the like into the thermistor 43 can be further enhanced.

Figure 10:
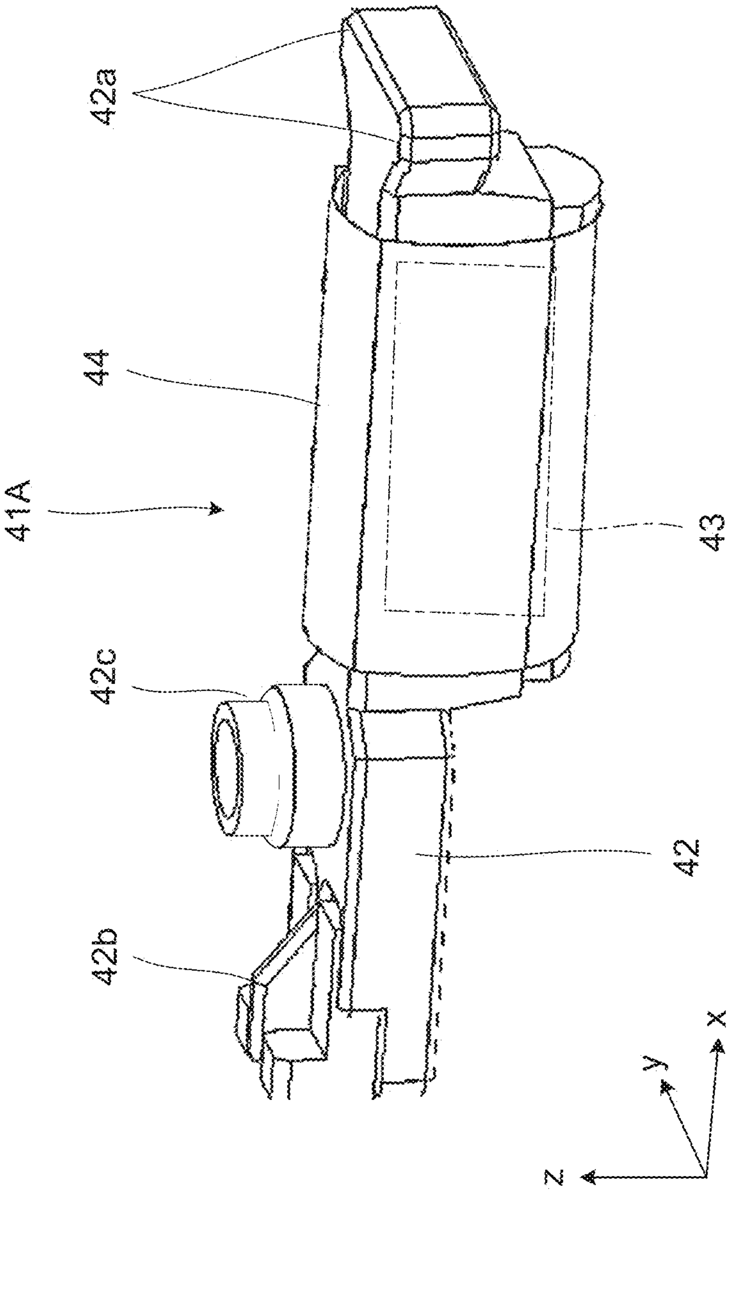
Fig.10 Related Art
FIG. 10 is a perspective view showing a thermistor device of a comparative example viewed from a lateral side.

FIG. 10 is a perspective view showing a thermistor device 41A of a comparative example viewed from a lateral side. The length of the lower half of the insulation sheet 44 of the thermistor device 41A of the comparative example shown in FIG. 10 is shorter than the length L of the lower half of the insulation sheet 44 of the thermistor device 41 of the present embodiment. For this reason, the thermistor device 41A of the comparative example has a shorter insulation distance than the thermistor device 41 of the present embodiment, and surrounding grease and the like are likely to intrude into the thermistor 43.

However, if the length L of the insulation sheet 44 is lengthened, as shown in FIGS. 7B and 7C, when the thermistor device 41 is mounted in the heater holder 24, the end of the insulation sheet 44 interferes with the boss 24*c* of the heater holder 24 so that the insulation sheet 44 will deform. If the insulation sheet 44 remains deformed, the thermistor 43 will be biased downward by the coil spring 53, and even if the insulation sheet 44 is sandwiched between the thermistor 43 and the surface-shaped heater 23, the flatness of the insulation sheet 44 will not be maintained, and the thermistor 43 will not be uniformly pressed against the upper surface of the surface-shaped heater 23 with the insulation sheet 44 therebetween, resulting in a significant error in the temperature of the surface-shaped heater 23 detected by the thermistor 43.

The proposer of the present disclosure has found that such deformation of the insulation sheet 44 due to interference with the heater holder 24 causes increase in error in the detected temperature of the surface-shaped heater 23 by the thermistor 43.

Hence, in the present embodiment, as shown in FIG. 7A, the lower part of the boss 24*c* of the heater holder 24 facing the end of the insulation sheet 44 is cut out, an inclined surface (cutout) 24*f* toward the lower outward side is formed in this lower, and a space SP is provided below the boss 24*c*.

Figure 7D:
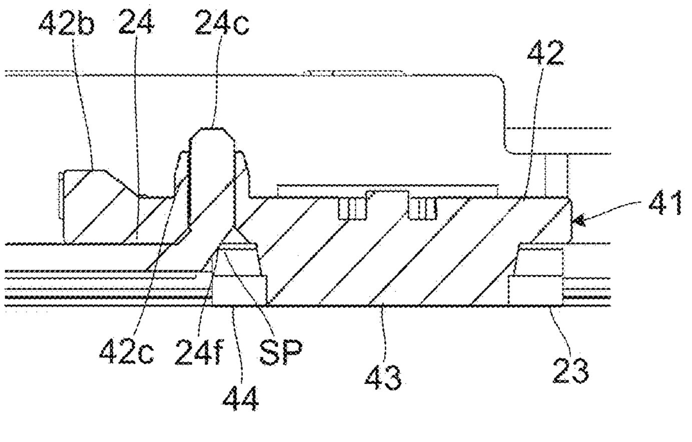

For this reason, as shown in FIGS. 7B and 7C, even if the end of the insulation sheet 44 interferes with the heater holder 24 and the end of the insulation sheet 44 bends and deforms in the middle of lowering the thermistor device 41 from above the rectangular opening 24*a* of the heater holder 24 and fitting the boss 24*c* of the heater holder 24 into the hollow annular part 42*c* of the frame 42 of the thermistor device 41, as shown in FIG. 7D, when the thermistor device 41 is mounted in the heater holder 24, the bent end of the insulation sheet 44 slides on the inclined surface 24*f* toward the lower outward side of the heater holder 24 and extends in the space SP so that the end of the insulation sheet 44 returns to the original shape.

That is, the heater holder 24 comes into contact with the end of the insulation sheet 44 and causes the insulation sheet 44 to deform in a process of mounting the thermistor 43 and the insulation sheet 44 in the heater holder 24. Further, in a state in which mounting of the thermistor 43 and the insulation sheet 44 in the heater holder 24 is completed, the inclined surface 24*f* releases the end of the insulation sheet 44 from contact with the heater holder 24.

Accordingly, the flatness of the insulation sheet 44 is maintained between the thermistor 43 and the surface-shaped heater 23, the thermistor 43 is uniformly pressed against the upper surface of the surface-shaped heater 23 with the insulation sheet 44 therebetween, and therefore the temperature of the surface-shaped heater 23 can be accurately detected by the thermistor 43.

Even in fixing devices other than those according to the present embodiment, it has been proposed to interpose ceramic paper between a thermistor and a heater, make the contact state of the thermistor with respect to the heater stable, and reduce an error in the temperature detected by the thermistor. Meanwhile, it is desirable to lengthen the insulation distance of the thermistor and favorably prevent intrusion of surrounding grease and the like into the thermistor. However, even in fixing devices other than those according to the present embodiment, since ceramic paper is simply provided near the thermistor, the insulation distance is not lengthened and intrusion of surrounding grease and the like into the thermistor is not favorably prevented. In addition, when the size of an insulation sheet such as ceramic paper is increased, the insulation sheet may interfere with surrounding components, the insulation sheet may deform due to this interference, and the contact state of the thermistor with respect to the heater may become unstable.

In contrast, according to the foregoing embodiment, while an insulation sheet wound around a thermistor is lengthened, the insulation distance of the thermistor is lengthened, and intrusion of surrounding grease and the like into the thermistor is favorably prevented, the contact state of the thermistor with respect to a heater can be prevented from becoming unstable due to interference of the insulation sheet with surrounding components.

The constitutions and the processing which have been described using FIGS. 1 to 10 are merely an embodiment of the present disclosure, and the present disclosure is not intended to limit to the constitutions and the processing.

While the present disclosure has been described in detail with reference to the embodiments thereof, it would be apparent to those skilled in the art that the various changes and modifications may be made therein within the scope defined by the appended claims.

What is claimed is:

1. A fixing device comprising:

an endless fixing belt;

a pressure roller brought into pressure-contact with the fixing belt;

a heater provided on an inward side of the fixing belt, receiving a contact pressure of the pressure roller via the fixing belt, and heating the fixing belt;

a thermistor disposed on a surface of the heater facing a side opposite to the fixing belt;

a flexible insulation sheet wound around the thermistor;

a heater holder holding the heater and having the thermistor around which the insulation sheet is wound mounted therein; and a biasing member pressing the thermistor mounted in the heater holder to the surface of the heater with the insulation sheet therebetween, wherein the heater holder comes into contact with an end of the insulation sheet and causes the insulation sheet to deform in a process of mounting the thermistor and the insulation sheet in the heater holder, and is shaped to have a cutout for releasing the end of the insulation sheet from the contact in a state in which mounting of the thermistor and the insulation sheet in the heater holder is completed.

2. The fixing device according to claim 1, wherein the cutout of the heater holder faces the end of the insulation sheet and is formed by an inclined surface facing an outward side of the heater holder.

3. The fixing device according to claim 1, wherein a space for receiving the end of the insulation sheet which has extended to an original shape due to the release is formed below the cutout of the heater holder in a state in which mounting of the thermistor and the insulation sheet in the heater holder is completed.

4. An image forming apparatus comprising:

the fixing device according to claim 1; and an image forming device forming an image on recording paper, wherein the fixing device thermally compresses an image formed on the recording paper with the recording paper in a nip area sandwiched between the fixing belt and the pressure roller.

* * * * *